UNITED STATES PATENT OFFICE.

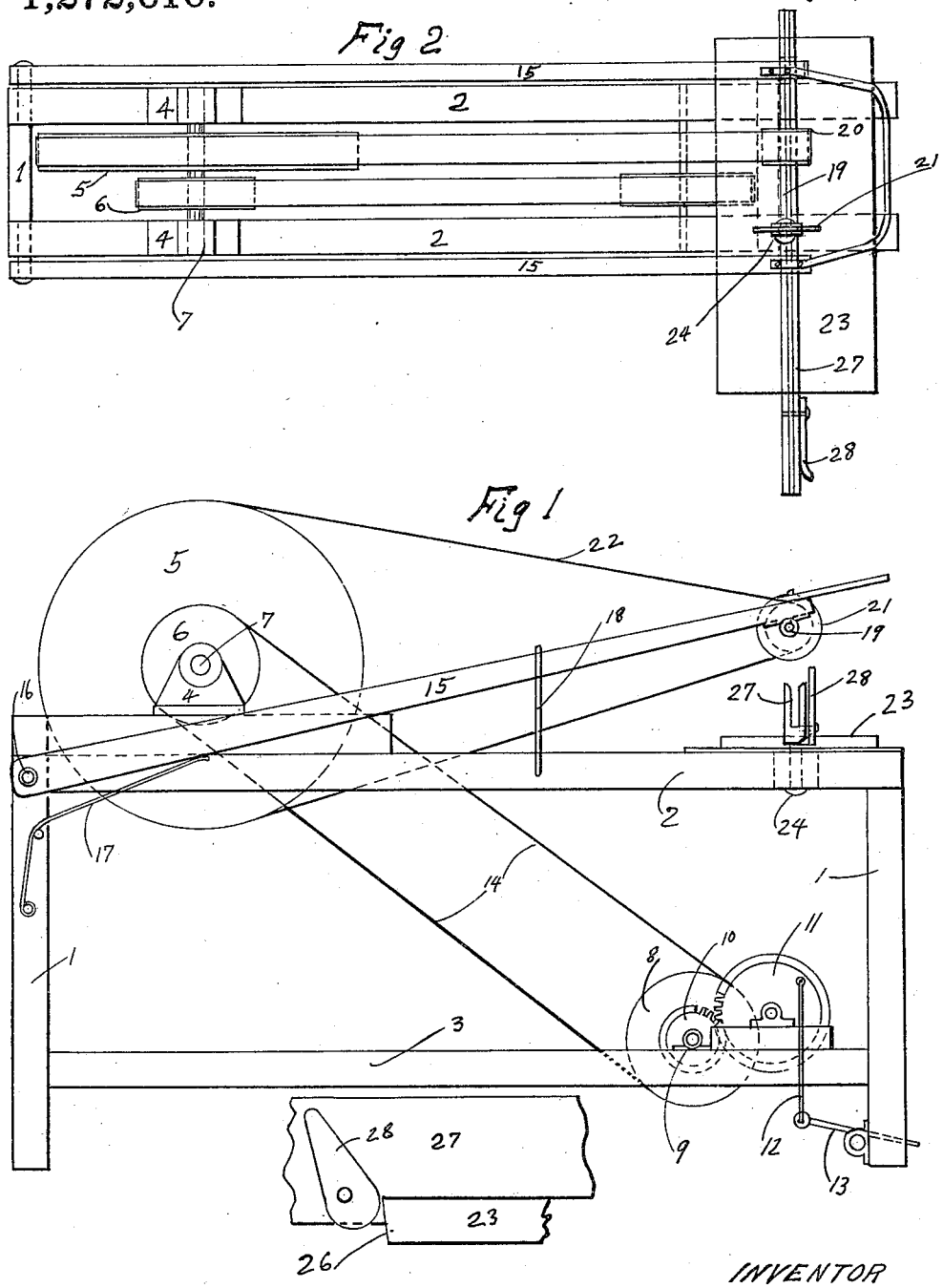

JOSEPH B. BUJOLD, OF GRANITE FALLS, WASHINGTON.

SAW-SHARPENING DEVICE.

1,272,616.             Specification of Letters Patent.    Patented July 16, 1918.

Application filed November 13, 1916.   Serial No. 130,976.

*To all whom it may concern:*

Be it known that I, JOSEPH B. BUJOLD, a citizen of the United States, and a resident of Granite Falls, in the county of Snohomish and State of Washington, have invented certain new and useful Improvements in Saw-Sharpening Devices, of which the following is a full, true, and exact specification.

My invention relates to saw sharpening devices and has for its principal object to provide an improved and novel manually operated device for filing and gumming cross cut saws and the like; to provide improved and novel means for turning the saw at an angle with respect to the sharpening means in order that oppositely disposed faces of adjacent teeth may be sharpened at the same time; to provide improved and novel means for regulating the tension of the belt which drives the sharpening means in order that the tension of the belt may be increased as the cutting of the sharpening means is increased while normally the tension of the belt is very light.

Other objects will appear as my invention is more fully explained in the following specification, illustrated in the accompanying drawing and pointed out in the appended claims.

In the drawings Figure 1 is a side-elevation of my device. Fig. 2 is a plan view of same with parts of the transmission mechanism omitted. Fig. 3 is an enlarged fragmentary end view illustrating means for clamping the saw holding device to the table.

Referring more particularly to the drawings, numeral 1 indicates end frame members upon the top of which are supported horizontal frame members 2 and near the bottom of which are secured bottom frame members 3. The frame members 2 are parallel and support bearings 4 which in turn support a large pulley 5 and small pulley 6 both of which are secured to a shaft 7. The lower frame members 3 support, in suitable bearings, a driving pulley 8 which is secured to a shaft 9. A pinion 10 is also secured to shaft 9 and meshes with a drive gear 11. Gear 11 is driven by means of an eccentrically connected rod 12 and a foot pedal 13. An endless belt 14 connects pulleys 6 and 8. Swinging arms 15 are pivotally connected to end frame 1 as at 16 one on either side of the top frame members 2. The swinging arms 15 normally extend forward and upwardly and are held in normal position by means of leaf springs 17. Limit stops 18 limit the upward movement of swinging arms 15. A shaft 19 is mounted on the outer ends of swinging arms 15 and to which is secured an arbor pulley 20 and an abrasive wheel 21. A belt 22 connects large pulley 5 and arbor pulley 20. It will be noted that the pivot point 16 is located somewhat below the horizontal plane of shaft 7 so that when the swinging arms 15 are pulled downwardly at the front end the straight line distance between the shafts 7 and 19 is increased, thereby tightening the belt 22. A saw table 23 is pivoted as at 24 to the top frame members 2 so that the table may have a horizontal movement about the said pivot. The ends of table 23 are under cut as at 26 in order that a saw frame 27 may slide over the said ends and be clamped in any desired position by means of a cam clamp 28. The saw frame 27 is slotted centrally in order to hold a cross cut saw. In operation a saw is placed in the frame 27 and the teeth positioned beneath the abrasive wheel 21. The swinging arms 15 are now lowered and the wheel brought into contact with the face of the tooth which it is desired to sharpen. When beveled cutter teeth are being sharpened, the table 23 is swung about the pivot points 24 and the abrasive wheel engages oppositely disposed faces of adjacent teeth, thereby sharpening two teeth at one operation. When the opposite sides of these teeth are to be sharpened, the table 23 is swung in the opposite direction. It will be noted that my device is manually operated, is light and easily portable, therefore is adapted to work in the woods and camps where power is not always available.

While I have shown a particular form of embodiment of my invention, I am aware that many minor changes therein will readily suggest themselves to others skilled in the art without departing from the spirit and scope of the invention, and I therefore desire to avoid being limited to the exact form shown and described except as required by the scope of the appended claims.

Having described my invention, what I claim as new and desire to protect by Letters Patent, is—

1. In a manually operated cross-cut saw filing device, the combination of a frame, a table mounted upon one end of said frame and horizontally swingable about a pivot point, saw supporting means removably attachable to said table whereby the relative position of the saw support and frame may be varied.

2. In a manually operated cross cut saw filing device, the combination of a frame, file supporting vertically swinging arms pivoted to said frame, a saw supporting table-pivoted to and horizontally swingable on said frame directly beneath the free end of said swinging arms, whereby a saw which is mounted on said table may be moved in adjustable angular relationship to the filing device.

JOSEPH B. BUJOLD.

Copies of this patent may be obtained for five cents each, by addressing the "Commissioner of Patents, Washington, D. C."